(12) United States Patent
Ringewald (10) Patent No.: US 8,364,595 B1
(45) Date of Patent: Jan. 29, 2013

(54) SECONDARY MARKET FOR DIGITAL OBJECTS

(75) Inventor: Erich Ringewald, Belvedere, CA (US)

(73) Assignee: Amazon Technologies, Inc., Reno, NV (US)

(*) Notice: Subject to any disclaimer, the term of this patent is extended or adjusted under 35 U.S.C. 154(b) by 531 days.

(21) Appl. No.: 12/435,927

(22) Filed: May 5, 2009

(51) Int. Cl.
G06Q 30/00 (2012.01)
G06F 17/30 (2006.01)
G06F 21/20 (2006.01)

(52) U.S. Cl. .............. 705/51; 705/1.1; 705/59; 726/4; 726/26; 707/600; 707/E17.005; 707/E17.055

(58) Field of Classification Search .............. 705/1.1, 705/51, 59; 726/4, 26; 707/600, E17.005, 707/E17.055
See application file for complete search history.

(56) References Cited

U.S. PATENT DOCUMENTS

| | | | | |
|---|---|---|---|---|
| 5,757,908 | A * | 5/1998 | Cooper et al. ............... | 713/165 |
| 7,249,107 | B2 * | 7/2007 | Yaacovi ........................ | 705/59 |
| 7,769,641 | B2 * | 8/2010 | Jouret et al. .................. | 705/26.1 |
| 7,818,811 | B2 * | 10/2010 | Kirovski et al. ............... | 726/26 |
| 7,995,505 | B2 * | 8/2011 | Beaupre et al. ............... | 370/276 |
| 8,117,274 | B2 * | 2/2012 | Schilders ...................... | 709/213 |
| 2004/0034601 | A1 * | 2/2004 | Kreuzer ........................ | 705/52 |
| 2004/0243686 | A1 * | 12/2004 | Schilders ...................... | 709/213 |
| 2006/0195515 | A1 * | 8/2006 | Beaupre et al. ............... | 709/203 |
| 2007/0106805 | A1 * | 5/2007 | Marples et al. .............. | 709/229 |
| 2007/0136608 | A1 * | 6/2007 | Kirovski et al. ............... | 713/193 |
| 2009/0165101 | A1 * | 6/2009 | Peterka et al. .................... | 726/6 |
| 2009/0193526 | A1 * | 7/2009 | Sweazey ........................ | 726/30 |
| 2010/0125511 | A1 * | 5/2010 | Jouret et al. .................... | 705/27 |

FOREIGN PATENT DOCUMENTS

WO WO2005/065026 A2 * 7/2005
WO WO2006/080772 A1 * 8/2006

OTHER PUBLICATIONS

Nair et al. ("Enabling DRM-preserving Digital Content Redistribution", Proceedings of the Seventh IEEE International Conference on E-Commerce Technology, IEEE Computer Society, Oct. 10, 2005, 8 pages).*

* cited by examiner

*Primary Examiner* — James D Nigh
(74) *Attorney, Agent, or Firm* — Lee & Hayes, PLLC (57) ABSTRACT

An electronic marketplace for used digital objects is disclosed. Digital objects including e-books, audio, video, computer applications, etc., purchased from an original vendor by a user are stored in a user's personalized data store. Content in a personalized data store may be accessible to the user via transfer such as moving, streaming, or download. When the user no longer desires to retain the right to access the now-used digital content, the user may move the used digital content to another user's personalized data store when permissible and the used digital content is deleted from the originating user's personalized data store. When a digital object exceeds a threshold number of moves or downloads, the ability to move may be deemed impermissible and suspended or terminated. Additionally or alternatively, a collection of objects may be assembled from individual digital objects stored in the personalized data stores of different users, and moved to a user's personalized data store.

21 Claims, 6 Drawing Sheets

SECONDARY MARKET FOR DIGITAL OBJECTS

BACKGROUND

By gaining access rights from owners, users may quickly and easily access a variety of digital objects, also known as content. These digital objects include images, electronic books "e-books," audio recordings, video recordings, computer applications, and other forms of information transferable over a communication network such as the internet.

As use of digital objects increases, users may wish to transfer the digital objects to other users. These transfers may include a sale, a rental, a gift, a loan, a trade, etc. However, several problems manifest when transferring a digital object. While a physical object such as a copy of a paperback book only exists in one place at a time, easy and inexpensive copies of a digital object without loss of fidelity are possible. Thus, easy copying and repeated sale of the same digital object is possible, potentially eliminating scarcity of the digital object. Because of this, many owners implement digital rights management to prevent such impermissible transfers. Furthermore, the digital object as originally transferred to the initial purchaser may have license restrictions or other limitations on permissible use or further transfer. For example, a license to use a free download of a popular song may expire after a few days.

A secondary market which allows users to effectively and permissibly transfer "used" digital objects to others while maintaining scarcity is therefore desired. A "used" digital object is one to which a user has legitimately obtained access or ownership rights (hereinafter "access rights"), and to which the user may permissibly transfer to another user.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As described above, digital objects ("objects") may include images, e-books, audio recordings, video recordings, computer applications, and any other forms of information transferable over a communication network such as the Internet. A used digital object is one which a user has legitimately obtained access rights to, and may permissibly transfer to another user. Transfer of used digital objects from the original purchaser to a subsequent purchaser of the used digital object may pose problems with respect to the first sale doctrine, license obligations, etc.

This disclosure describes an electronic marketplace ("marketplace") facilitating a secondary market for digital objects. The electronic marketplace includes a system enabling users to store digital objects in a personalized data store and permissibly transfer used digital objects and/or the rights to use the used digital objects to other users via the electronic marketplace. A personalized data store may also be known as a digital locker and may be implemented as a non-resident, user-specific storage location of digital objects accessible by one or more devices at one or more locations through one or more networks. Accordingly, the personalized data store may be maintained in remote storage (e.g., a remote database, a network based storage resource such as a cloud storage service, etc.). A permissible transfer of digital objects includes a conveyance of access rights associated with a digital object which is made in accordance with policies enforced in the marketplace, and may include digital object licensing conditions, legal requirements of the country or jurisdiction to which the marketplace is subject, etc. Each user may access his or her personalized data store, and the digital objects stored within it.

In various different implementations, digital objects in a user's personalized data store may be streamed to the user's local computing device, downloaded to the user's local computing device, transferred to another personalized data store, or otherwise accessed by a user through a personalized data store interface via one or more devices at one or more locations via one or more networks. As used herein, the term "transfer" refers to any type of conveyance of digital objects or portions thereof from one storage location or computing device to another. "Downloading," "streaming," and "moving" are three specific types of transfers. Permissible transfers include permissible moves, permissible downloads, permissible streaming, etc. As used herein, the terms "download" and "downloading" refer to transfer of a digital object from one storage location or computing device to another storage location or computing device, combined with storage of the digital object at the receiving storage location or computing device. The terms "stream" and "streaming" refer to transfer of a digital object from one storage location or computing device to another storage location or computing device, without maintaining the digital object at the receiving storage location or computing device after conclusion of the streaming. Thus, downloading results in a copy of the used digital object being fixed (at least temporarily) in memory of the receiving storage location or computing device, whereas streaming is transitory in nature such that the used digital object is present in memory of the receiving storage location or computing device only substantially contemporaneously with the act of streaming.

The terms "move" and "moving" refer to transfer of a digital object from one storage location or computing device to another storage location or computing device, combined with storage of the digital object at the receiving storage location or computing device and deletion of the digital object from the sending storage location or computing device. One example of a move is a move of a digital object between personalized data stores. In some implementations, used digital objects may remain freely movable between personalized data stores until the occurrence of certain events, at which point moves between personalized data stores are no longer permitted.

Thresholds may be set which limit transfer of a used digital object after the occurrence of certain events. For example, a threshold may limit how many times a used digital object may be permissibly moved to another personalized data store, how many downloads (if any) may occur before transfer is restricted, etc. These thresholds help to maintain scarcity of digital objects in the marketplace and/or to comply with licensing requirements of the digital object, by putting conditions on when and how many times used digital objects may be transferred. These limits may be set for a specific digital object, a digital object type (such as a particular title of book), a digital object category (such as all movies), etc. In some cases, a user with limited rights to move or download a used digital object may still have access to the used digital object stored in the personalized data store. For example, a user unable to move the used digital object between personalized data stores or download the used digital object, may continue to access the used digital object in his or her personalized data store via streaming, via the personalized data store interface, etc. Alternatively, a user's ability to access the used digital object by streaming may also be limited upon the occurrence of certain events.

In one example, a user may use the personalized data store interface to access and manage used digital objects within his or her personalized data store. A user may move available used digital objects to personalized data stores of other users, maintain a list of wanted used digital objects (for example, songs the user would like to have moved to his or her personalized data store), maintain a list of used digital objects which are available for movement (for example, songs the user no longer wants to be able to access), etc. The movement of the available used digital object to another user's personalized data store may be a result of a sale, rental, loan, gift, trade, etc.

Users may also use their personalized data store interface to list or otherwise seek to obtain a wanted collection of digital objects. A collection of digital objects includes two or more digital objects. For example, a collection of digital objects may be all songs found on a particular album, or all episodes of a particular television show from a particular season. When a user seeks a collection of digital objects, a search of used digital objects available for movement in other personalized data stores takes place. Once used digital objects are located, the collection is built and the collection may then be moved to the personalized data store of the requesting user. Note that in some instances, the collection may be built from used digital objects owned by multiple different users.

Illustrative Environment for an Electronic Marketplace

Figure 1:
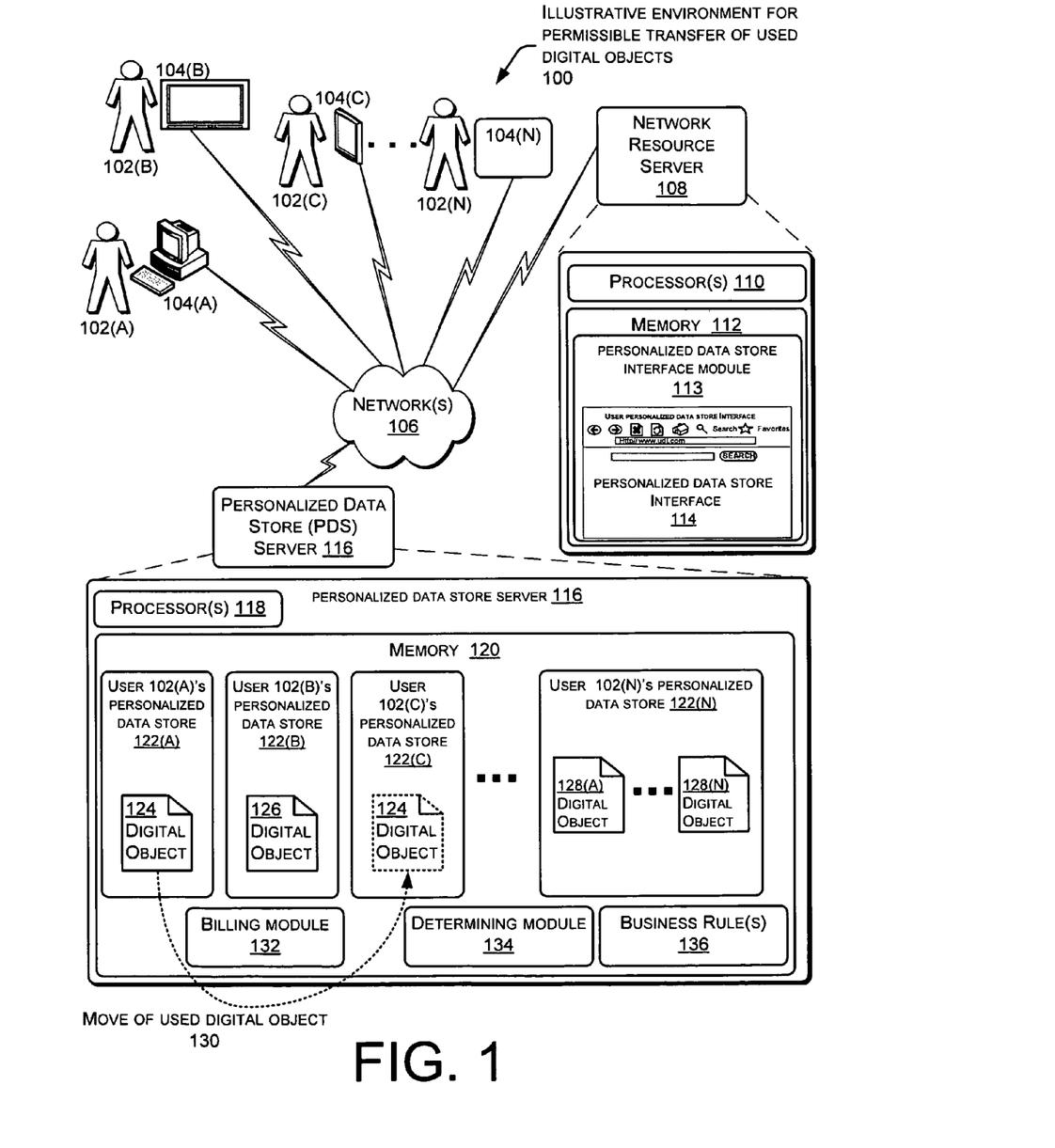
FIG. 1 is a schematic diagram of an illustrative environment for implementing a method and system that enable permissible transfer of used digital objects among different users.

FIG. 1 is a schematic diagram of an illustrative environment 100 for implementing a method and system that enable permissible transfer of used digital objects among different users, thus creating a secondary market for used digital objects within an electronic marketplace. In environment 100, many users 102(A), 102(B), to 102(N) may use an electronic device 104(A), 104(B), to 104(N) to access a network 106 and establish communication with a server 108 implementing a network resource, e.g., a website. As used in this application, "N" is any integer number greater than zero.

Network 106 may be any type of communication network, including the Internet, a local area network, a wide area network, a wireless wide area network, a cable television network, a wireless network, a telephone network, etc. Network 106 allows communicative coupling between electronic devices 104 and servers, such as network resource server 108.

Electronic devices 104 may include a personal computer 104(A), an entertainment system 104(B), a personal digital assistant (PDA) 104(C), or other computing device 104(N) that is capable of communicating over a network, including but not limited to, set-top boxes, mobile phones, digital media players, tablets, laptop computers, desktop computers, electronic book readers, game consoles, servers, etc.

Network resource server 108 may be either a single server or a larger collection of servers, such as a data center or multiple data centers. Network resource server 108 may include one or more processors 110 and a memory 112, the memory comprising one or more computer-readable storage media (CRSM). The CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a processor. The processor 110 is configured to execute instructions stored in the memory 112.

For example, a personalized data store interface module 113 may be stored in memory 112 and executed by the processor 110 to provide a personalized data store interface 114 to a user. The personalized data store interface 114 provides access functionality to users 102 of a personalized data store server 116 connected to the network resource server 108 via network 106. The personalized data store server 116 may be located on the same or a separate server as the network resource server 108 and may also include either a single server, or a larger collection of servers, such as a data center or multiple data centers. Personalized data store server 116 may include one or more processors 118 and a memory 120, the memory including one or more computer-readable storage media (CRSM). Processor 118 is configured to execute instructions stored in the memory 120.

In one embodiment, stored within memory 120 is a plurality of personalized data stores 122(A), 122(B), 122(C), to 122(N), each associated with a user account. As shown in the illustrated example, user 102(A) has personalized data store 122(A) which stores used digital object 124. User 102(B) has personalized data store 122(B) which stores used digital object 126. User 102(C) has personalized data store 122(C) which is initially empty. User 102(N) has personalized data store 122(N), which may store used digital objects 128(A) to 128(N). That is, a user may store as many digital objects as his or her personalized data store can hold, such as up to a pre-determined storage limit defined in size in bytes, a number of files, etc. This storage limit may be fixed or may be variable (e.g., with time, with payment of additional fees, etc.). When multiple users hold the same access rights from an owner for the same digital object (for example, many people may have rights to view the movie "Blade Runner"), a separate copy of the used digital object may be stored in each individual personalized data store, or the personalized data store may contain a reference or pointer to a centralized copy. While the personalized data stores 122(A) through 122(N) are shown stored in memory 120, in other examples, the personalized data stores 122(A) through 122(N) may be stored in different memories residing on the same or different servers or in remote data storage accessible by the digital locker server 116.

A user may stream, download, or otherwise access a used digital object stored in his or her personalized data store. Used digital objects may also be moved from one personalized data store to another for a variety of reasons, when the move is permissible. For example, a user may permissibly move a used digital object from one of his personalized data stores to another of his personalized data stores. In another example, a user may permissibly move a digital object to a personalized data store of another user of the electronic marketplace. In the illustrated example, a used digital object 124 may be permissibly moved 130 from user 102(A)'s personalized data store 122(A) to user 102(C)'s personalized data store 122(C). Once permissibly moved, used digital object 124 is no longer in user 102(A)'s personalized data store 122(A) and now resides only in user 102(C)'s personalized data store 122(C). In some embodiments, a billing module 132 may be configured to levy a fee upon transfer (e.g., movement, download, and/or streaming) of a used digital object. A determining module 134 may be configured to determine whether to permit or deny transfer of the used digital object according to one or more business rules 136.

Figure 2:
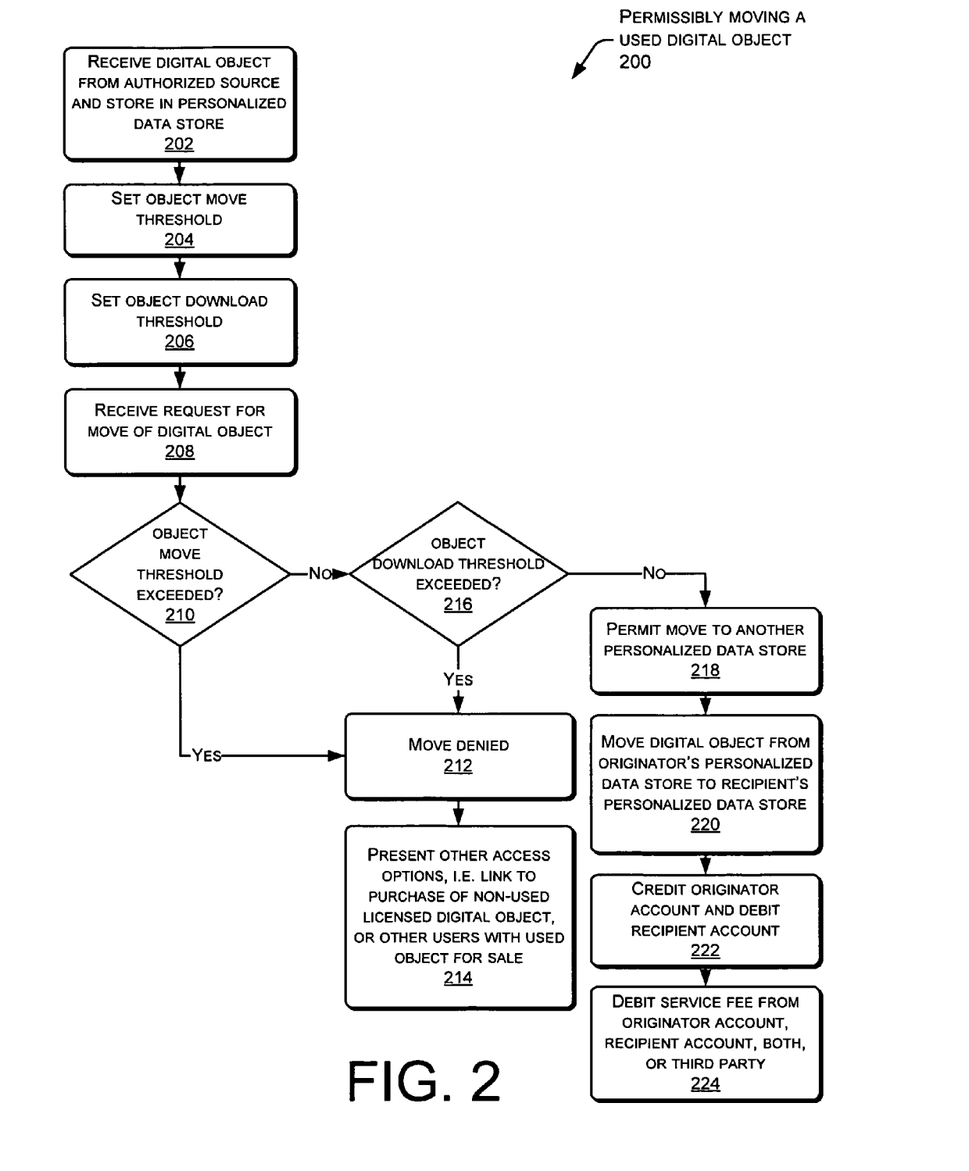
FIG. 2 is a flow diagram of an illustrative method of moving a used digital object.

FIG. 2 is flow diagram of an illustrative method for permissibly moving a used digital object 200 to another personalized data store. At 202, a digital object received from an authorized source is stored in a personalized data store. This authorized source may be a publisher, a bookseller, another user with legitimately obtained rights to transfer, a merchant, or another trusted source permitted to distribute access rights to digital objects and/or digital objects themselves to users. In one embodiment, upon storage of the digital object in a user's personalized data store, an object move counter ("OMC") and an object download counter ("ODC") for the used digital object may be initialized to zero or, if the object has been previously moved or downloaded, may retain the values of the authorized source. When moving the used digital object, the OMC is incremented. The OMC may be used to implement a policy in the marketplace where digital objects may only have a finite number of moves between personalized data stores, thus producing scarcity within the marketplace. It will be appreciated that when a used digital object is downloaded to another location, particularly to a location beyond the data store server 116, the personalized data store service provided by the data store server 116 may no longer be able to control the access rights to the used digital object and impermissible transfers of the used digital object could be made. Therefore, the ODC may be used to implement a policy in the marketplace where digital objects may only be downloaded from the user's personalized data store a finite number of times, if at all, thus maintaining control over the digital object and producing scarcity both inside and outside the marketplace. For example, the ODC may be incremented when a user downloads a digital object to the user's local computing device. The ODC may also be incremented when a user downloads the digital object to a storage location outside of the marketplace.

At 204, an object move threshold ("OMT") may be set. The OMT may limit the number of transfers of a used digital object to other personalized data stores when the used digital object has been moved more than a threshold number of times, thereby helping to maintain the scarcity of the digital object in the marketplace. For example, a popular used digital object such as a song may have an OMT of three, only allowing three permissible moves of the song to other personalized data stores. After the OMT is reached, the used digital object is no longer permissibly moveable to another personalized data store.

Where multiple personalized data store servers administered by different entities are available, the OMT may change. For example when one entity offers a first personalized data store service and a second entity offers a second personalized data store service, the OMT may be set to five for moves within the first personalized data store service and one for moves to the second personalized data store service. Thus, users within the first personalized data store service may permissibly move the used digital object up to five times to other users of the first personalized data store service, but only once to a user of the second personalized data store service.

User identification information may also be used to modify the OMT. For example, the OMT may be set to allow five permissible moves between a first set of users (e.g., users located in a specified geographic area, users having a premium membership, users purchasing a premium version of the digital object, users belonging to a specified group, etc.) but only one permissible move to a second set of users (e.g., users located outside the specified geographic area, users having a basic membership, users purchasing a basic version of the digital object, users not belonging to the specified group, etc.).

At 206, an object download threshold ("ODT") may be set. As discussed above, after downloading a digital object, control over that digital object may be lost. Thus, the ODT may be used to limit the number of downloads of a digital object from a personalized data store, further maintaining the scarcity of the digital object in the marketplace. For example, a popular digital object such as a song may have an ODT of zero, thus never allowing download of the song from the personalized data store. If set to one, the ODT would permit the user to download the song once from his or her personalized data store to, e.g., his or her personal media player or to another personalized data store, but thereafter the user would lose the ability to download the song again.

The ODT may also be configured to limit the number of permissible downloads by type (i.e., model) of electronic device or identification of a specific electronic device used to consume the digital content. During download, the server 108 may acquire the type of electronic device or identification number. For example, if a media player device incorporates digital rights management to prevent duplication of digital objects, the ODT may be set to five when downloading to that particular media player device, but otherwise be set to zero. Thus, a user may permissibly download the digital object five times to the same media player device, while retaining the ability to move the digital object to other users if desired. However, after downloading just once to a different device, such as a personal computer, further downloads and/or moves are not permitted, while streaming may still be permitted.

At 208, a request for movement of a used digital object from one personalized data store to another personalized data store is received. The network resource server 108, personalized data store server 116, or another server or device acting as a proxy for the personalized data store server 116 may receive the request. At 210, when the OMT for the used digital object is exceeded, at 212 the move is denied as impermissible. After denial, at 214, presentation of other access options such as purchase or movement of another available digital object to a user may take place. For example, a user may be presented with a "new" non-used digital object available for purchase and/or a list of used digital objects available for purchase. The user may then elect to try again and either purchase a "new" digital object from an owner, merchant, etc., or attempt to acquire a "used" digital object from another personalized data store.

A move limit business rule may set the OMT 204 to limit transfers in the electronic marketplace. A download limit business rule may set the ODT 206 to limit downloads in the electronic marketplace. These business rules 136 may be stored in memory 120 and configured to execute on the processor 118. The move limit business rule and download limit business rule may operate independently or in conjunction with one another to determine whether to authorize or deny the request for movement of the used digital object. In the case of the move limit business rule, the determination may be made by the determining module 134 querying the OMC and comparing the OMC to the OMT. In the case of the download limit business rule, the determination may be made by the determining module 134 querying the ODC and comparing the ODC to the ODT.

When the OMT is not exceeded at 210, the method proceeds to 216 to determine whether the ODT is exceeded. If, at 216, the ODT is determined to have been exceeded, the move is denied 212 and the user may be presented with other licensing options 214. Because control over a digital object may be lost at the time of download, restricting a number of permissible downloads helps to maintain control over the digital object and maintain scarcity in the marketplace. While the OMT is described as being checked before the ODT, the ODT may also be checked before the OMT. In another embodiment the check of the OMT at 210 or the check of the ODT at 216 may be omitted. For example, where the move limit business rule places no limits on moves between personalized data stores but restricts moves or other transfers after a single download, only the ODT would be necessary.

When, at 216, neither the OMT nor the ODT are found to have been exceeded, the used digital object is determined to be "available" and movement to another personalized data store is permissible. Thus, at 218, movement is permitted. Accordingly, at 220, the digital object is moved from the personalized data store of the originator to the personalized data store of the recipient, and the originator no longer retains a copy within their personalized data store.

At 222, when compensation for a permissible transfer takes place, such as when an originator is selling his or her access rights to a recipient, a credit may be made to an originator account while a corresponding debit (possibly less a transfer fee described next) may be made to the recipient's credit card or other payment account. The originator and recipient accounts may be maintained as part of the personalized data store service or through third party merchants or processors. The credit or fee may be a in the form of currency, points, stored value, etc.

At 224, an entity may levy a fee for the transfer instead of, or in addition to, the compensation of 222. The fee may be levied from the originator, recipient, both, or a third party. For example, a third party which owns the digital content may choose to pay the transfer fee of digital objects to encourage distribution of previously licensed digital objects. The entity levying the fee may be the operator of the personalized data store server, owner of the digital object receiving a royalty, etc.

In another implementation, the OMC and ODC's may be set to a pre-determined maximum value at initialization, and decremented at each movement or download, respectively. Thus, instead of comparing against a threshold, movement or download is determined to be impermissible when the counter is zero. For example, if the ODC is initialized to one, upon download of the digital object the ODC is decremented to zero, indicating that downloads are no longer permissible. Furthermore, where unlimited movement is permissible until a digital object is downloaded, the OMC may be omitted and the ODC used to determine when a download or movement is impermissible. Taking the example above, if the ODC is greater than zero, moves remain permissible.

Figure 3:
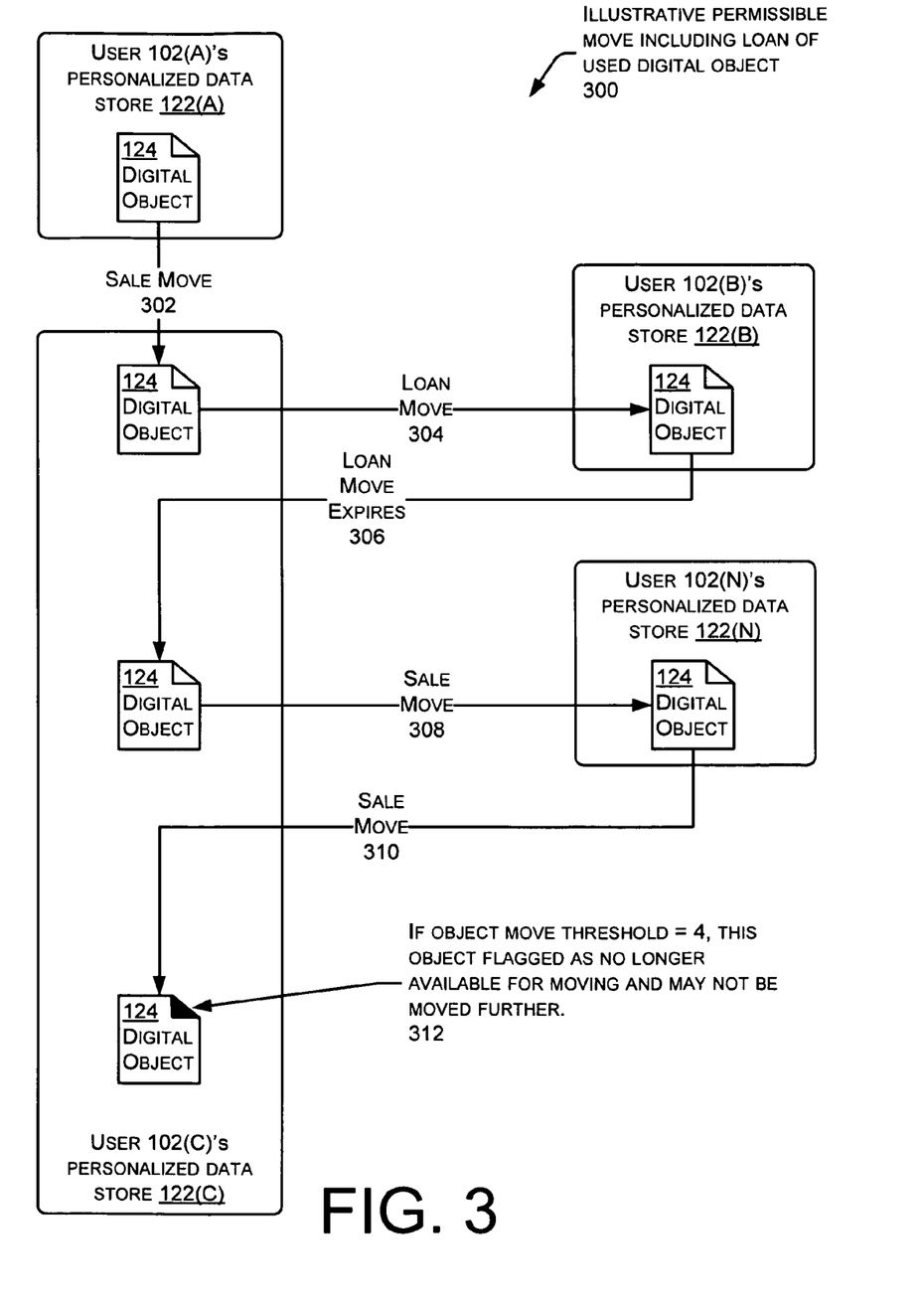
FIG. 3 is a flow diagram of an illustrative method of moving a used digital object and designating the used digital object as no longer available for further movement after exceeding a threshold number of moves.

FIG. 3 is a flow diagram of an illustrative method 300 of moving a used digital object and designating the used digital object as no longer available for further movement after exceeding a threshold number of moves. Illustrated are the personalized data stores 122(A), 122(B), 122(N), and 122(C) for users 102(A), 102(B), 102(N), and 102(C), respectively. Assume the OMT is set to four in this example.

In this illustration, digital object 124 begins in personalized data store 122(A) with user 102(A) having access rights. User 102(A) agrees to make a permissible sale move 302 of digital object 124 to user 102(C), and the OMC is incremented from zero to one. The move takes place, removing digital object 124 from personalized data store 122(A) to now reside in personalized data store 122(C).

Now suppose user 102(C) decides to loan digital object 124 to user 102(B). A permissible loan move 304 is made, the OMC is incremented from one to two, and digital object 124 is removed from personalized data store 122(C) and now resides in personalized data store 122(B). A digital object loan may be of indefinite duration, have an expiration date, or some other triggering event which terminates the loan. For example, a user may loan a digital object which is an e-book to a friend until the friend purchases her own copy of the e-book.

When the loan expires, at 306 digital object 124 is removed from personalized data store 122(B), the OMC is incremented from two to three, and digital object 124 is returned to the personalized data store 122(C) of the originating user 102(C). In another example, upon the expiration of a loan or rental, the OMC may be decremented upon return of the digital object to the personalized data store of origin.

User 102(C) then decides to make a permissible sale move 308 of digital object 124 to user 102(N). Digital object 124 is removed from personalized data store 122(C), the OMC is incremented from three to four, and now resides in personalized data store 122(N).

User 102(C) finds that she wishes to repurchase digital object 124, and makes a permissible sale move 310 of digital object 124 from user 102(N). Digital object 124 is removed from personalized data store 122(N), the OMC is incremented from four to five, and digital object 124 now resides in personalized data store 122(C).

In the illustrated example, digital object 124 is flagged as being unavailable for further movement 312 as its OMC now exceeds the OMT. As described earlier with respect to FIG. 2, when the OMC for a digital object exceeds the OMT, further moves are impermissible, and further moves requests are denied. However, while prohibiting movement to other personalized data stores, the user may continue to access digital object 124, for example via streaming or other access permitted through the personalized data store interface 114. A perceived value of the digital object may change as the OMC is increased. For example, an item with a high OMC may be considered less valuable because of its limited ability to move in the future. Or an item with a high OMC may be perceived more valuable if no longer available for direct purchase from the content owner. As described above, limits on moves, downloads, or other transfers helps enforce the rights of digital object owners or creators, and maintains scarcity in the electronic marketplace.

Figure 4:
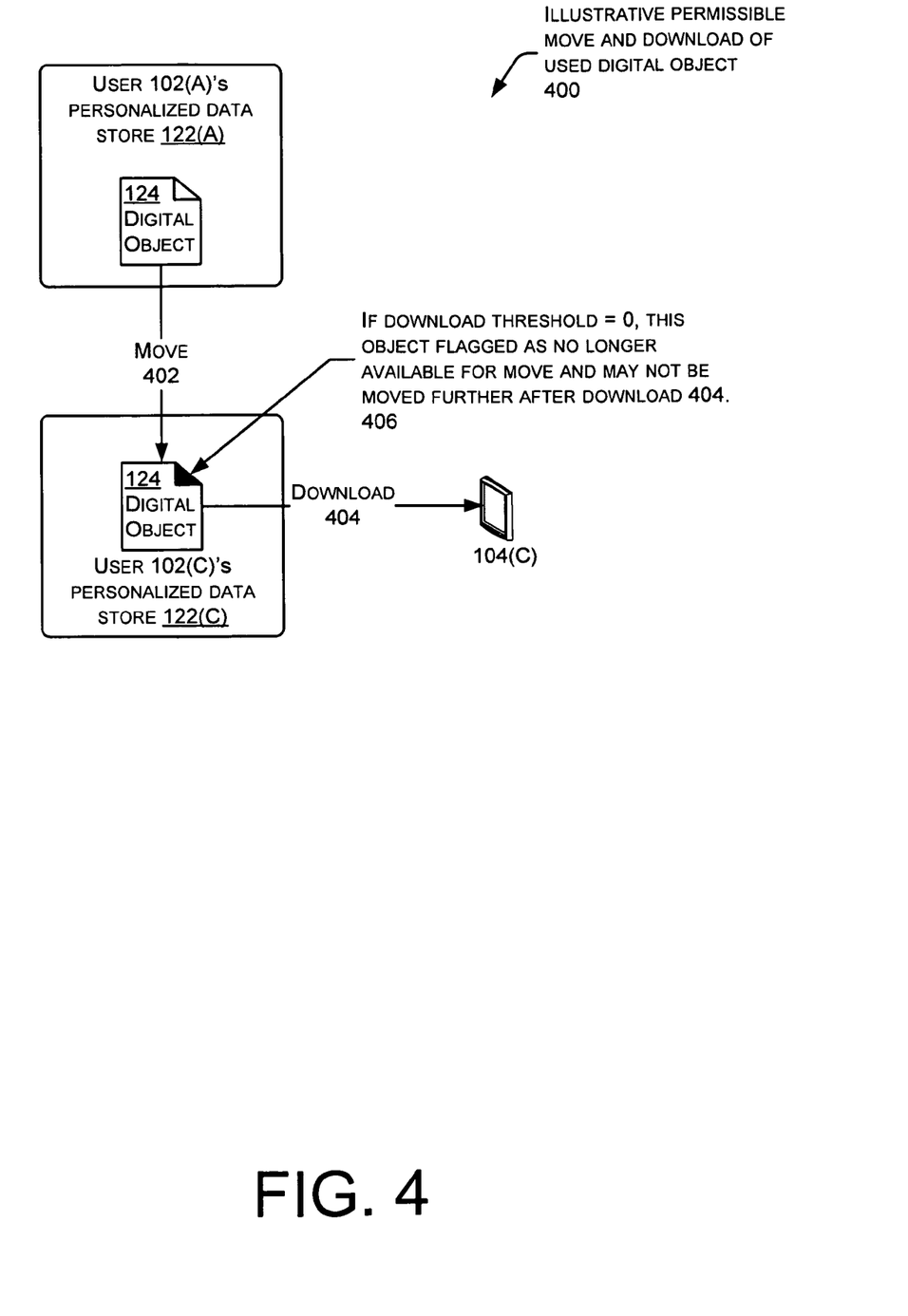
FIG. 4 is flow diagram of an illustrative method of downloading a used digital object and designating the downloaded digital object as no longer available for further movement after exceeding a threshold number of downloads.

FIG. 4 is flow diagram of an illustrative method 400 of downloading a used digital object and designating the downloaded digital object as no longer available for further movement after exceeding a threshold number of downloads.

Illustrated are personalized data stores 122(A) and 122(C) for users 102(A) and 102(C), respectively. Assume the ODT is set to zero in this illustration. Digital object 124 begins in personalized data store 122(A) with user 102(A) having access rights. User 102(A) decides to make a permissible move 402 of digital object 124 to user 102(C), and the OMC is incremented from zero to one. Digital object 124 is moved from personalized data store 122(A) to personalized data store 122(C).

User 102(C) then downloads 404 digital object 124 to PDA device 104(C), thus incrementing the ODC from zero to one, as described above. Because the ODT is set to zero further moves are impermissible and, at 406, the user may not subsequently move digital object 124 to another personalized data store. However, while prohibiting moves to other personalized data stores as described above, the user 102(C) may continue to access digital object 124 from her personalized data store 122(C), for example via streaming or other access permitted through the personalized data store interface 114.

In another example, the ODT may be set to one, while the OMT is set to an infinite value or disregarded. Thus, the digital object 124 could be moved with no limitation until the object is downloaded once, at which point further moves are impermissible.

Building a Digital Object Collection

Figure 5:
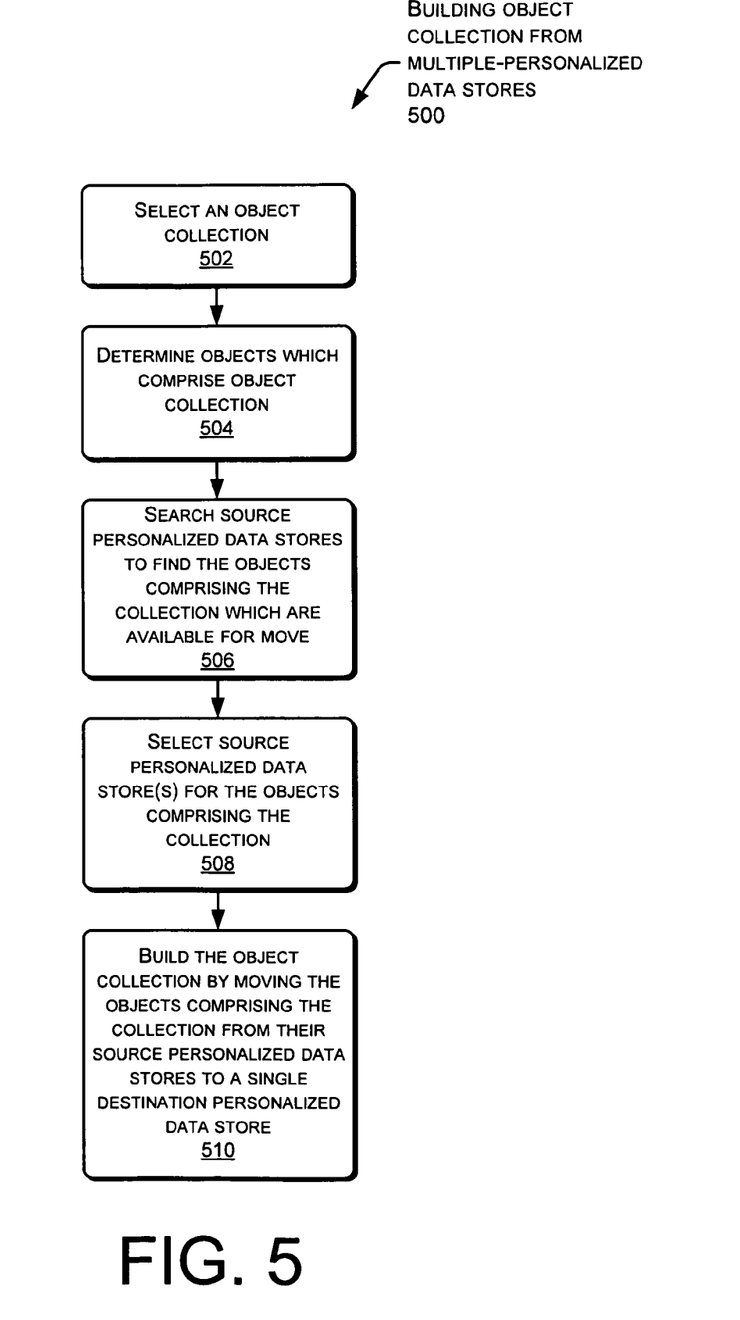
FIG. 5 is a flow diagram of an illustrative method of building a digital object collection from digital objects located in multiple personalized data stores.

FIG. 5 is a flow diagram of an illustrative method 500 of building a digital object collection from used digital objects located in multiple personalized data stores. A collection of digital objects includes two or more digital objects. For example, a collection of digital objects may be all songs found on a particular album, or all episodes of a particular television show from a particular season. Thus, while a particular album (digital object collection) may no longer be available for purchase, multiple users may hold individual songs (digital objects) which, when assembled, are equivalent to the particular album.

At 502, a digital object collection is selected. At 504, the individual digital objects forming the object collection are determined. At 506, a search of source personalized data stores is made. Source personalized data stores include personalized data stores of users which have used digital objects available for movement. As described below, users may select privacy settings on their personalized data stores to indicate whether they want their personalized data store to be available as a source personalized data store. For example, a user may opt to preclude search of her personalized data store contents entirely, permit search of digital objects in the personalized data store available for movement, or permit search of all digital objects in her personalized data store. Where a user allows searching of all digital objects, the user may be presented with an option to allow or deny a movement of a digital object from her personalized data store.

At 508, source personalized data stores for the digital objects found in the selected digital objected collection are selected. This selection may include multiple factors. For example, a user may want to have his digital object collection compiled only from the least expensive available used digital objects. Alternatively, the user may only want to compile his digital object collection from members of an affinity group, such as club, church, or social networking group.

At 510, the digital object collection is built by permissibly moving the digital objects found in the collection from their source personalized data stores to a single destination personalized data store.

Illustrative Personalized Data Store Interface

Figure 6:
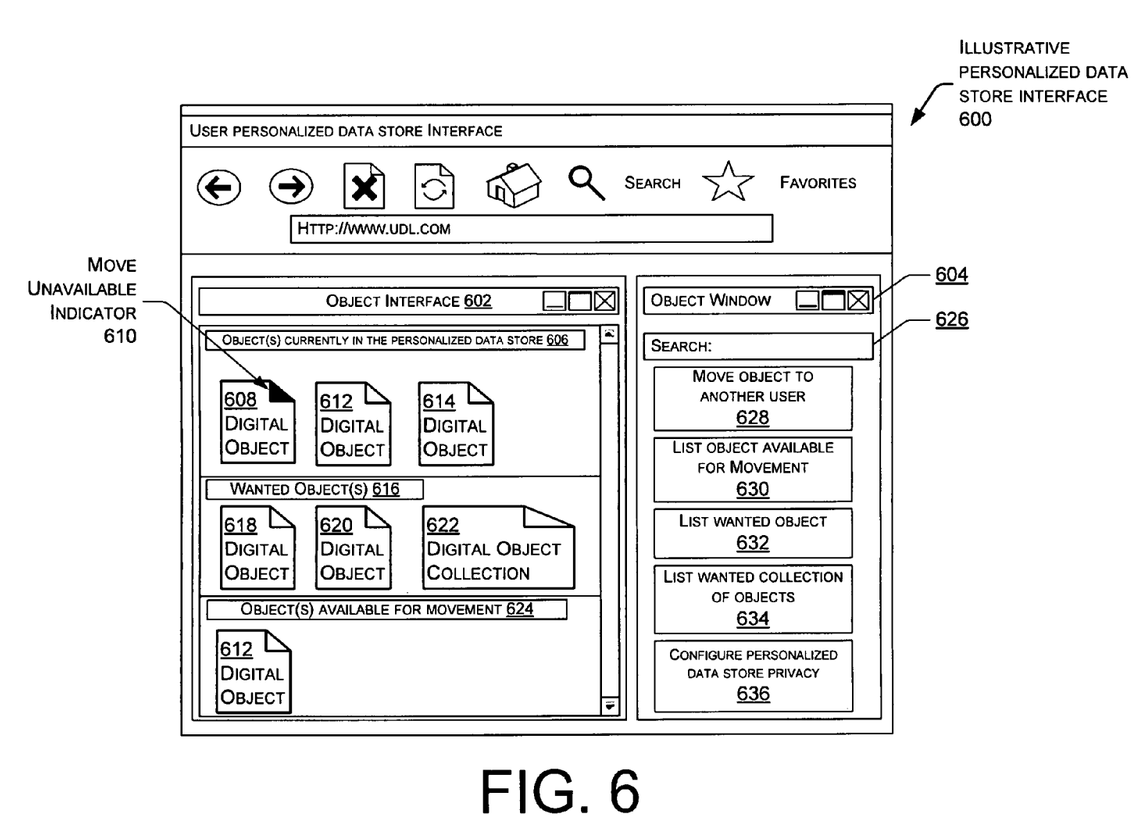
FIG. 6 is a schematic diagram of an illustrative data store interface.

FIG. 6 is a schematic diagram of an illustrative personalized data store interface 600 presented by network resource server 108. Depicted are object interface 602 and object window 604. Within object interface 602, status of digital objects ("new" and/or used) in relation to a user's personalized data store may be presented. For example, objects currently in the user's personalized data store are displayed 606. In the illustrated example, the objects in the user's personalized data store include digital object 608, which is denoted with a move unavailable indicator 610, signifying that this digital object may not be moved to other personalized data stores. As described above, this may have occurred by exceeding an OMT, ODT, or both thresholds. In other embodiments this indicator may be displayed because the user has designated that digital object 608 cannot be moved. Those skilled in the art will appreciate that other indicators may be used to designate if downloads, streaming, or other transfers are unavailable. Digital objects 612 and 614 are also displayed as being digital objects currently in the personalized data store in 606, and are eligible for movement (which, in the illustrated example, is made apparent by the lack of a move unavailable indicator).

In the illustrated embodiment, wanted digital objects 616 are also displayed and include digital object 618, digital object 620, and digital object collection 622. These are digital objects to which the user wishes to acquire access rights.

Digital objects available for movement 624 may also be presented. In the illustrated example, digital object 612 has been designated by the user as being available for movement. For example, perhaps digital object 612 is a song in which the user is no longer interested. In contrast, digital object 614 is still of interest to the user, so the user has chosen not to make digital object 614 available for movement. However should the user lose interest, digital object 614 is not yet precluded from movement to other personalized data stores. Because the user may choose to make digital object 614 available for movement, the move unavailable indicator 610 is not shown. As described above, digital object 608 is no longer eligible for movement between personalized data stores and is thus flagged with the move unavailable 610 indicator.

Returning to object window 604, a search box 626 is also displayed in the illustrated example. Search box 626 provides an area for a user to input information about a desired digital object. For example, a user may search to find a particular digital object to add to the wanted digital objects 616 or a digital object in the user's own personalized data store.

A move control 628 to transfer an object to another user may also be presented. Activation of this control allows a user to initiate a request for movement of a digital object as described in FIG. 2 at block 208.

An available control 630 to identify an object as being available for movement may also be presented. Activation of this control allows a user to designate that a selected digital object is available for movement to others, for example, a used digital object for sale. When a move is unavailable, such as may be denoted with the move unavailable indicator 610, this control may be disabled and the user may be precluded from designating the used digital object as being available for movement.

A wanted control 632 to identify a wanted digital object may also be presented. Activation of this control allows a user indicate digital objects being sought from other users. Entry of a wanted object may also trigger a search of other users' available digital objects and presentation of a purchase interface.

As also illustrated, a wanted collection control 634 to identify a wanted collection of objects is presented. Activation of this control allows a user indicate what collection of digital objects is being sought from others. As with control 632, entry of a wanted collection of objects may trigger a search of other users' available digital objects and presentation of a purchase interface.

A privacy control 636 to configure personalized data store privacy may also be presented. Activation of this control allows a user to set his or her personalized data store privacy parameters. These parameters may include user permission to allow viewing a list of personalized data store contents by other users, (and if so, whether for all users or a defined group), searching of personalized data store contents for possible movement (and whether to require confirmation of moves, or allow any moves), searching of only digital objects in the personalized data store available for movement, searching of all digital objects in their personalized data store.

CONCLUSION

Although specific details of illustrative methods are described with regard to the figures and other flow diagrams presented herein, certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

Conditional language, such as, among others, "can," "could," "might," or "may," unless specifically stated otherwise, or otherwise understood within the context as used, are generally intended to convey that certain embodiments include, while other embodiments do not include, certain features, elements and/or steps. Thus, such conditional language is not generally intended to imply that features, elements and/or acts are in any way required for one or more embodiments or that one or more embodiments necessarily include logic for deciding, with or without user input or prompting, whether these features, elements and/or steps are included or are to be performed in any particular embodiment.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
one or more processors; and
computer-readable storage media encoded with instructions that, when executed on the one or more processors, instruct the one or more processors to perform acts for enabling permissible transfer of used digital objects among different users in an electronic marketplace, the acts comprising:
storing a used digital object obtained from an authorized source in a first personalized data store, wherein the first personalized data store is associated with an account of a first user and is accessible by an electronic device associated with the first user, and wherein the used digital object is a digital object in which the first user has legitimately obtained access rights;
determining that the used digital object is available for transfer from the first personalized data store;
providing an indication that the used digital object is available for transfer from the first personalized data store;
receiving a request to transfer the used digital object to a second personalized data store, wherein the second personalized data store is associated with an account of a second user and is accessible by an electronic device associated with the second user;
authorizing transfer of the used digital object to the second personalized data store based on satisfaction of one or more business rules;
upon authorization of the request to transfer the used digital object to the second personalized data store, transferring the used digital object from the first personalized data store to the second personalized data store; and
deleting the used digital object from the first personalized data store.

2. The system of claim 1, wherein the one or more business rules comprise a move limit business rule, and wherein authorizing transfer of the used digital object further comprises:
initializing an object move counter to count a number of moves of the used digital object between personalized data stores;
setting an object move threshold, the object move threshold defining a number of times the used digital object can be moved;
applying the move limit business rule stored in memory to determine whether to authorize or deny the request for transfer of the used digital object, application of the move limit business rule comprising:
querying the object move counter to determine a number of times the used digital object has been moved;
comparing the object move counter to the object move threshold;
denying the request for transfer of the used digital object as impermissible when the object move counter of the used digital object exceeds the object move threshold; and
authorizing the request for transfer of the used digital object to the second personalized data store when the object move counter of the used digital object is within the object move threshold.

3. The system of claim 2, wherein the request for transfer comprises a request for movement, wherein the transferring comprises moving the used digital object from the first personalized data store to the second personalized data store, and wherein the acts further comprise incrementing the object move counter upon movement of the used digital object from the first personalized data store to the second personalized data store.

4. The system of claim 3, wherein denying the request for transfer comprises denying the request for movement, while still permitting streaming of the used digital object from the first personalized data store.

5. The system of claim 4, wherein streaming of the used digital object from the first personalized data store to the electronic device of the user is permitted as long as the user retains access rights to the used digital object.

6. The system of claim 3, the acts further comprising levying a fee when moving the used digital object from the first personalized data store to the second personalized data store.

7. One or more computer-readable storage media encoded with instructions that, when executed on one or more processors, instruct the one or more processors to perform acts comprising:
- determining that one or more used digital objects are available for transfer from a first personalized data store to another location, wherein the first personalized data store is associated with an account of a first user and wherein the first user has legitimately obtained access rights to the one or more used digital objects;
- providing an indication that the one or more used digital objects are available for transfer from a first personalized data store to another location;
- receiving a request to transfer at least one of the one or more used digital objects from the first personalized data store;
- authorizing the transfer of the at least one used digital object based on satisfaction of one or more business rules;
- upon authorization of the request to transfer the at least one used digital object to the other location, transferring the at least one used digital object from the first personalized data store to the other location; and
- deleting the at least one used digital object from the first personalized data store.

8. The one or more computer-readable storage media of claim 7, wherein the other location comprises a personalized data store associated with an account of a second user, another personalized data store associated with an account of the first user, or an electronic device of the user.

9. The one or more computer-readable storage media of claim 8, wherein the other location is administered by a same entity that administers the first personalized data store.

10. The one or more computer-readable storage media of claim 8, wherein the other location is administered by a different entity than an entity administering the first personalized data store.

11. The one or more computer-readable storage media of claim 7, wherein the one or more business rules comprise a download business rule defining a predetermined number of permissible downloads, and the acts further comprise:
- denying the request for transfer of the at least one used digital object as impermissible when the used digital object has been downloaded more than the predetermined number of times; and
- authorizing transfer of the at least one used digital object to the other location when the used digital object has been downloaded at most the predetermined number of times.

12. The one or more computer-readable storage media of claim 11, wherein the predetermined number of permissible downloads is zero.

13. The one or more computer-readable storage media of claim 7, wherein the one or more business rules comprise a move limit business rule, and wherein satisfaction of the move limit business rule comprises:
- initializing an object move counter to count a number of moves of the used digital object between personalized data stores;
- setting an object move threshold, the object move threshold defining a number of times the used digital object can be moved; and
- determining that the object move counter of the used digital object is within the object move threshold.

14. The one or more computer-readable storage media of claim 13, the acts further comprising denying the request for transfer of the at least one used digital object as impermissible when the object move counter of the used digital object exceeds the object move threshold, while still permitting streaming of the used digital object from the first personalized data store to an electronic device of the user.

15. The one or more computer-readable storage media of claim 7, the acts further comprising:
- receiving, from a user, a single selection of an object collection, wherein the object collection comprises multiple digital objects; and
- at least partly in response to receiving the selection from the user:
- determining the multiple digital objects that make up the object collection;
- searching multiple personalized data stores to find source personalized data stores containing used digital objects that make up the collection which are available for movement;
- selecting the used digital objects that make up the collection from the source personalized data stores; and
- building the object collection by permissibly moving the used digital objects that make up the collection from the source personalized data stores to the second personalized data store.

16. The one or more computer-readable storage media of claim 15, wherein used digital objects are available for movement if an object has been moved less than or equal to a predetermined move threshold number of times and has been downloaded less than or equal to a predetermined download threshold number of times.

17. The one or more computer-readable storage media of claim 7, the acts further comprising initializing an object type for the used digital object upon receipt, and setting an object move threshold according to the object type, the object move threshold defining a predetermined number of times that the used digital object is permissibly movable before movement is restricted.

18. The one or more computer-readable storage media of claim 7, the acts further comprising causing display of the used digital objects currently in the first personalized data store.

19. The one or more computer-readable storage media of claim 7, the acts further comprising causing display of wanted used digital objects for inclusion into the first personalized data store.

20. The one or more computer-readable storage media of claim 7, the acts further comprising causing display of one or more of the following:
- a move control to move a selected used digital object to another personalized data store;
- an available control to list a selected used digital object as available for movement;
- a wanted control to list a wanted used digital object;
- a collection control to list a wanted collection of digital objects; and
- a privacy control to configure personalized data store privacy settings.

21. The system of claim 1, wherein the first and second personalized data stores are accessible via the electronic marketplace.

* * * * *